W. JOHNSTON.
BICYCLE FRAME.
APPLICATION FILED OCT. 11, 1917.
1,298,958.
Patented Apr. 1, 1919.
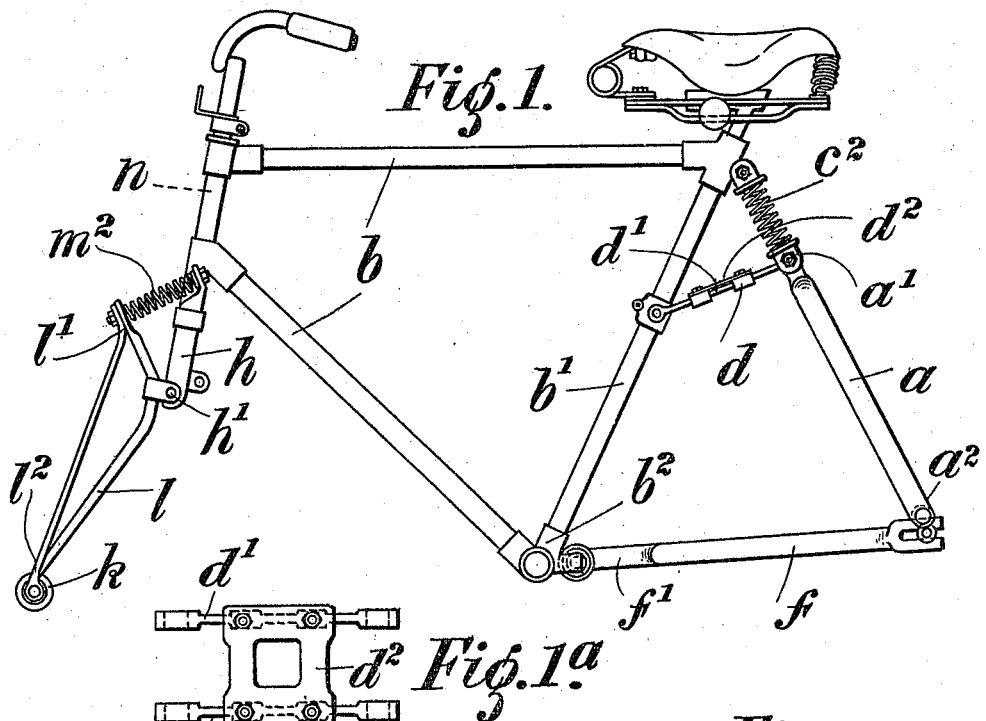
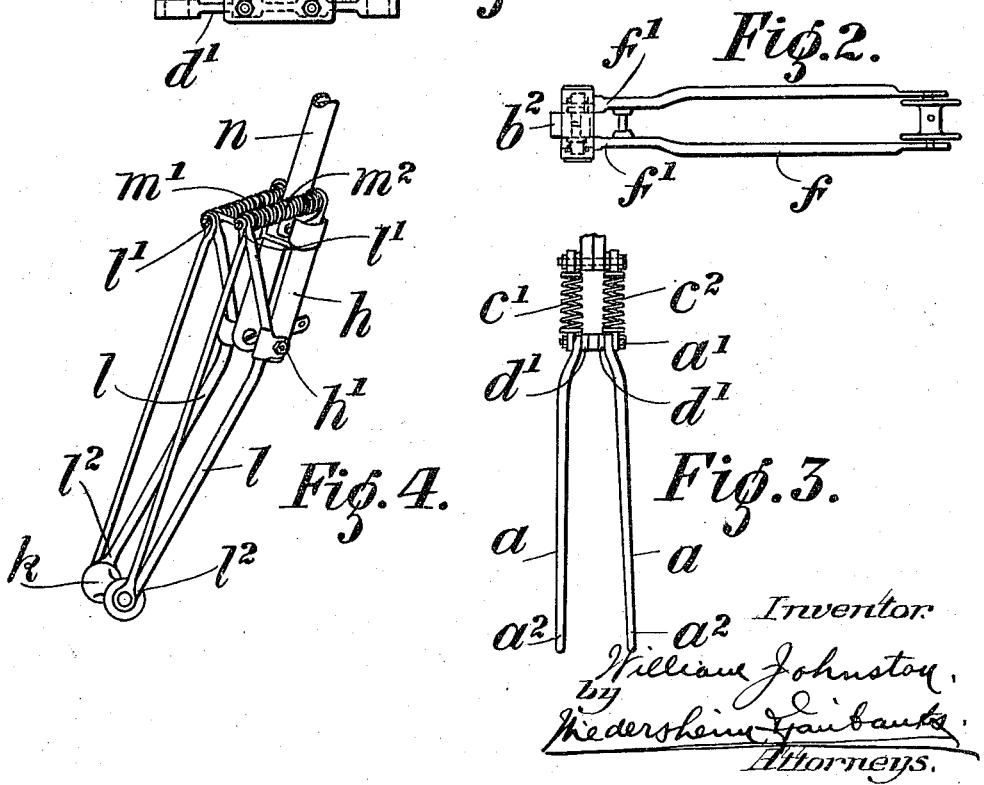

UNITED STATES PATENT OFFICE.

WILLIAM JOHNSTON, OF BELFAST, IRELAND.

BICYCLE-FRAME.

1,298,958.　　　　　Specification of Letters Patent.　　Patented Apr. 1, 1919.

Application filed October 11, 1917. Serial No. 195,884.

*To all whom it may concern:*

Be it known that I, WILLIAM JOHNSTON, of Belfast, Ireland, a subject of the King of Great Britain and Ireland, have invented certain new and useful Improvements Relating to Bicycle-Frames, of which the following is a specification.

This invention relates to bicycle frames and its object is to provide an improved so called "spring suspension," or shock absorbing arrangement, for the back and front forks of the frame. The invention relates specifically to frames of this class in which a movable back fork is connected to the seat pillar tube, and the front fork connected to the steering pillar tube, by a cushioning spring arrangement.

Under this invention I provide, between the seat pillar tube and the top of the back fork, a pivotal stay device which is adapted to hold the back fork against lateral displacement, the device being turnably connected at one end to the seat pillar and at the other end turnably connected with the top of the back fork and so as to be only movable up and down but not laterally. For the front fork a pivotal stay device is also provided and arranged to act in conjunction with the cushioning spring arrangement.

In order that the invention may be clearly understood I have hereunto appended an explanatory drawing, whereon:—

Figure 1 shows a bicycle frame fitted with my improvements.

Fig. 1ª is a detail view of the pivotal stay device connecting the back fork with the seat pillar.

Fig. 2 is a plan view of the back stays $f$ showing the hinge connection with the bottom bracket.

Fig. 3 is a detached rear view of the back fork $a$.

Fig. 4 is an enlarged perspective view of the front fork with its pivotal stay device and springs.

The bicycle frame shown has the back fork $a$, at its top $a^1$, connected by springs $c^1$ and $c^2$ to the seat pillar tube $b^1$ and, between the tube $b^1$ and the top $a^1$ of the fork $a$ I provide a stay member $d$ for holding the back fork $a$ against lateral displacement, said stay member being constituted by links $d^1$ with a plate $d^2$ between, as shown particularly at Fig. 1ª. The links $d^1$ are pivotally connected to the seat pillar tube and to the fork so as to permit the necessary vertical movements of the fork relatively to the seat pillar tube. The hub end $a^2$ of the back fork $a$ is jointed with the back stays $f$ and the inner ends $f^1$ of the stays $f$ are movably connected with the bottom bracket $b^2$ of the frame $b$ so as to allow the hub end of the stays $f$ and the back fork $a$ to move up and down as the wheel encounters obstructions, or depressions, on the road, in order that the shocks and vibrations thereby given to the wheel may be absorbed by the springs $c^1$ and $c^2$, as usual, and be prevented from acting on the seat pillar. Preferably I make the turnable or hinge connection between the back stays and the bottom bracket to work on ball bearings, in order to avoid friction and wear as far as possible.

The front fork $h$ of the machine frame is connected with the front hub $k$ through the medium of a stay device consisting of bars $l$ pivotally connected to the fork, at $h^1$, and also having their upper ends, $l^1$, connected to the fork through the medium of the springs $m^1$ and $m^2$. Preferably, the front fork $h$ is made about half its usual length, as shown, and the bars $l$, which carry the front hub at their lower ends $l^2$, are pivotally connected, to the end of the fork, at the point $h^1$ between their ends. This arrangement gives complete freedom for brake operating mechanism, as the top of the steering pillar $n$ is left free. The springs $m^1$ and $m^2$ will, normally, be subjected to compression by the raising of the front hub $k$ when passing over any obstructions on the road but they may be put in tension if, for example, the front wheel should be run against a wall.

The hinge connection between the bottom bracket and the back stays is preferably made with the outer, or sleeve part, on the back stays as shown at Figs. 1 and 2, so that, if desired, a gear case could be so fitted thereon as to move with the hub as it moves up and down.

Suitable oiling means may be provided at the moving parts.

Having now fully described my invention what I claim and desire to secure by Letters Patent is:—

In a frame for bicycles, a back fork, a duplex parallel spring cushioning device connected at its upper end with the head of the seat pillar tube of the frame and at its lower end with the top of the back fork, duplex pivotal stays connecting the top end of the back fork with the seat pillar tube for retaining the back fork against lateral movement, and a plate connecting together the duplex pivotal stays to strengthen same.

In testimony whereof I affix my signature in presence of two witnesses.

WILLIAM JOHNSTON.

Witnesses:
ANDREW HAMILTON,
JOHN KNOX.

Copies of this patent may be obtained for five cents each, by addressing the "Commissioner of Patents. Washington, D. C."